United States Patent [19]

Sano et al.

[11] 3,962,212

[45] June 8, 1976

[54] PHOSPHORYLATED CELLULOSE ESTER MEMBRANE FOR USE IN SEPARATION OR CONCENTRATION OF SUBSTANCES

[75] Inventors: Takezo Sano, Ibaragi; Takatoshi Shimomura, Toyonaka, both of Japan

[73] Assignee: Sumitomo Chemical Company, Limited, Osaka, Japan

[22] Filed: May 13, 1974

[21] Appl. No.: 469,281

[30] Foreign Application Priority Data

May 16, 1973 Japan.............................. 48-54887

[52] U.S. Cl.............................. 260/219; 106/196; 106/177; 210/500 M
[51] Int. Cl.$^2$...................... C08L 1/12; C08L 1/20; C08B 7/00
[58] Field of Search.................... 106/177, 219, 196; 264/41; 260/219; 210/500 M

[56] References Cited
UNITED STATES PATENTS

| | | | |
|---|---|---|---|
| 1,962,828 | 6/1934 | Malm................................. | 260/219 |
| 2,981,730 | 4/1961 | Martin................................ | 260/219 |
| 3,140,256 | 7/1964 | Martin................................ | 210/23 |
| 3,567,809 | 3/1971 | Ueno et al.......................... | 106/177 |

OTHER PUBLICATIONS

Journal of Polymer Science, vol. 11, pp. 201–205, (1973).

*Primary Examiner*—Theodore Morris
*Attorney, Agent, or Firm*—Stevens, Davis, Miller & Mosher

[57] ABSTRACT

A novel phosphorylated cellulose ester membrane containing 0.1 to 10 % of phosphorus and having a selective permeability. This permselective phosphorylated cellulose ester membrane consists essentially of a phosphorylated cellulose ester obtained by reacting a phosphorylating reagent such as phosphorus oxychloride with a lower aliphatic acid ester of cellulose, which has a reactive hydroxyl group, in an organic solvent, and then hydrolyzing the resulting ester. The membrane can be used widely in separating materials by processes such as reverse osmosis, ultrafiltration, dialysis, electrodialysis, and the like.

11 Claims, No Drawings

PHOSPHORYLATED CELLULOSE ESTER MEMBRANE FOR USE IN SEPARATION OR CONCENTRATION OF SUBSTANCES

This invention relates to a novel phosphorylated cellulose ester membrane useful for the separation or concentration of substances.

An object of this invention is to provide a novel phosphorylated cellulose ester membrane having a selective permeability, which can be used widely in separating materials by various processes such as reverse osmosis, ultrafiltration, dialysis, electrodialysis, and the like, and also to provide the manufacturing method of said membrane.

The phosphorylated cellulose ester membrane of this invention consists essentially of a phosphorylated cellulose ester obtained by reacting a phosphorylating reagent such as phosphorus oxychloride with a lower aliphatic acid ester of cellulose, which has a reactive hydroxyl group, in the form of an organic solvent solution, and then hydrolyzing the resulting ester. Membranes suitable for the above-said various processes are obtained by properly controlling the phosphorylation reaction of the cellulose ester, thereby to vary various factors such as phosphorus content, ion-exchange capacity, water content, etc., of the resulting phosphorylated cellulose ester.

For example, there may be adopted a method whereby phosphate groups are introduced in a cellulose ester, which comprises reacting a phosphorylating reagent in the presence or absence of a suitable base with a cellulose ester dissolved in a suitable solvent to chlorophosphonate the hydroxyl group. To go into some detail, a cellulose ester is dissolved in a solvent, and reacted with a phosphorylating reagent and, if necessary, a base to remove hydrogen chloride formed during the reaction; the phosphorus content of the product may be controlled as desired by adjusting the factors such as concentration of the cellulose ester in the solution, molar ratio of the hydroxyl group in the cellulose ester to the phosphorylating reagent, reaction temperature, etc. Concentration of the cellulose ester in the solution is generally 0.1 to 35 %, preferably 1 to 25 %. Molar ratio of the hydroxyl group in cellulose ester to the phosphorylating reagent is from 0.1 to 1000, preferably 1 to 100. The reaction temperature ranges from −78°C. to the boiling point of the solvent employed, preferably from 0 to 30°C. In order to obtain a membrane which is excellent in the performance for separating materials for various purposes and retains sufficient strength while in use, it is desirable to control the reaction so that the phosphorus content of the hydrolyzate may become 0.1 to 10 %.

Hydrolysis of the chlorophosphonated cellulose ester is easily effected by simply treating the ester generally with water or a dilute aqueous alkali solution. The hydrolysis can be carried out by pouring the solution containing the reaction mixture from the chlorophosphonation step directly into water prior to the film-casting, or, alternatively, by preparing a film-casting solution composition directly from said reaction solution, casting a film on a clean plate glass surface from said composition, and, after a suitable period of time, immersing the cast film in water. A period of several minutes is generally sufficient for the hydrolysis to be complete.

The cellulose esters to be used as the starting material for such a membrane can be any of those which have a reactive hydroxyl group. Examples of such esters include cellulose esters of lower aliphatic acids such as formic acid, acetic acid, propionic acid, β-hydroxypropionic acid, butyric acid, lactic acid, tartaric acid, pyruvic acid, malic acid, maleic acid, methacrylic acid, crotonic acid, sorbic acid, succinic acid, methylsuccinic acid, ethylsuccinic acid, propylsuccinic acid, and adipic acid, and mixed esters of these acids. Of the esters listed above, cellulose acetate and cellulose butyrate are particularly preferred.

The desirable reagents for phosphorylating the cellulose ester are phosphorus oxychloride ($POCl_3$) and phosphorus oxybromide ($POBr_3$), though other phosphorylating reagents can be used without causing any particular trouble. Phosphorus oxychloride and phosphorus oxybromide are suitable in view of mildness of the reaction, causing no decrease in molecular weight of the cellulose ester.

The solvents to be used in dissolving the cellulose ester are methyl acetate, acetone, methyl ethyl ketone, acetyl methyl cellulose, nitromethane, and chloroform. Of these, acetone is preferred.

The bases for use in removing hydrochloric acid are pyridine, diethylamine, and triethylamine. Of these, pyridine is preferred.

The phosphorylated cellulose ester thus obtained has the following structure:

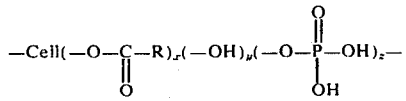

where "Cell" represents cellulose structural unit,

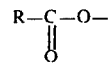

represents a lower aliphatic acid residue, and $x$, $y$, and $z$ are positive numbers satisfying the relation $x + y + z = 3$.

The permselectivity of the membrane is greatly affected by casting conditions, particularly the composition, evaporation rate, and evaporation temperature of the solvent used in the casting solution. Consequently, by varying these factors and by properly selecting, in addition, the period of hydrolysis in the case of direct casting from the reaction solution, it is possible to govern, as desired, the molecular weight cut-off characteristics of the membranes and also to control the size of pores in the membranes ranging from a symmetric membrane to an asymmetric or porous membrane.

The symmetric membrane is commonly cast from a solution of phosphorylated cellulose ester in a good solvent. Examples of such good solvents are formic acid, acetic acid, acetic anhydride, dimethylformamide, dimethyl sulfoxide, m-cresol, α-pyrrolidone, triethyl phosphate, and acetone. Preferred among these are formic acid and acetone.

On the other hand, the asymmetric or porous membrane is formed when a film is cast from the reaction mixture solution, which has been removed of precipitated hydrochloride, and, after having been freed from a part of the solvent by evaporation, the cast film is hydrolyzed by immersion in water. A more general procedure comprises casting a film from a solution of the phosphorylated cellulose ester in a solvent mixture of the aforesaid good solvent and a poor solvent having at least a higher boiling point than that of the good solvent, and, after removal of a part of the solvent by evaporation, treating the cast film by immersion in a coagulating liquor. The coagulating liquor should be a nonsolvent for the phosphorylated cellulose ester and, at the same time, a solvent compatible with both the good solvent and the poor solvent employed in the casting solution. Examples of poor solvents are water, methanol, formamide, pyridine, of which water is preferred. Examples of the coagulating liquors which can be used are water, alcohols, and ketones.

The casting solution which gives a membrane of asymmetric structure is prepared by adding 5 to 50 % by volume of a poor solvent to a good solvent containing a phosphorylated cellulose ester. The time of immersion of the cast film, after partial evaporation of the solvent, in a coagulating liquor should be sufficient for the membrane to develop the structure, which usually requires one minute to several hours. The period of solvent evaporation determines the surface structure of membrane. When the period is long an asymmetric membrane having a thin high-density surface layer is obtained, while when the period is short a porous membrane having no such high-density surface layer is obtained. low-molecular-weight Although there exists, of course, no sharp border line, there is used, in general, an asymmetric membrane in the electrodialysis where water permeability is not required, a thin symmetric membrane or an asymmetric membrane having a thin high-density surface layer in the reverse osmosis where a high water-permeability as well as a solute impermeability to the solute are required, and either a porous membrane or a symmetric membrane in the ultrafiltration or dialysis where permeabilities of both water and a low-molecular-weigh solute are required.

The membrane thickness can be varied over a wide range by varying the polymer concentration in a casting solution and the clearance of an applicator, but a thickness of 1 to 500 $\mu$ is suitable for the membrane to maintain sufficient mechanical strengths and practically useful physical properties. The casting plate generally emmloyed in membrane preparation is plate glass, metal beltings, or the like. It is also possible to cast a membrane on woven or nonwoven backing material of natural or synthetic fibers of the purpose of reinforcing the membrane. By use of a reinforcing material in the proper form, it is feasible to produce membranes of various shapes, particularly of a plate type or a tubular type.

It is one of the characteristic features of the present phosphorylated cellulose ester membrane that the permselectivity of the membrane depends on its phosphorus content.

In reverse osmosis, the dissolution process of water into the membrane has an important meaning. When the phosphate content falls within the range of 1 to 10 %, water permeability of the present phosphorylated cellulose ester membrane is so high due to hydrophilic property of the phosphate group that the membrane is best suited for use in the reverse osmosis. It is particularly desirable to use the present phosphorylated cellulose ester membrane in separating inorganic salts by reverse osmosis, because the membrane is a charged membrane having cation-exchange property, and hence, exhibits a higher inherent ability to exclude anions in the feed solution, as compared with usual uncharged membranes when used in the material-separating process. The present membrane shows no change in membrane performances when stored dry, in contrast to commercial cellulose acetate membranes which, once dried, show a markedly deteriorated performance that cannot be restored to the original level.

For a membrane to be used in ultrafiltration and dialysis, a high selective permeability to the solute is an absolutely necessary condition. To be suitable for such a membrane, phosphorous content of the phosphorylated cellulose ester material is desirably in the range from 3 to 10 %. In the said range, no loss is found in mechanical strengths of the membrane. When used as dialyzing membrane for an artificial kidney, the present membrane also gives favorable results with respect to anticoagulation of blood, owing to the phosphate group in a side chain.

In order to obtain an ion-exchange membrane having an optimum combination of the selective permeability and the electric conductivity, it is desirable to prepare a membrane containing phosphate groups corresponding to an ion-exchange capacity of 0.1 to 3.5, preferably 1 to 2, meq/g (meq/g means milliequivalent per gram of the membrane). Such a membrane has an electric resistance per unit surface area of 5 to 11 $\Omega.cm^2$ and can be used as an ion-exchange membrane for use in ordinary electrodialysis.

Since the present phosphorylated cellulose ester membrane has such characteristic properties as mentioned in the foregoing, it can be widely utilized in a unit operation for separating materials. For example, components which can be separated from aqueous solutions by reverse osmosis include inorganic salts comprising anions such as fluoride ion, bromide ion, chloride ion, nitrate ion, sulfate ion, phosphate ion, chromate ion, borate ion, and carbonate ion, and cations such as sodium ion, potassium ion, magnesium ion, calcium ion, ferrous ion, ferric ion, and barium ion; organic compounds such as alcohol, phenols, amines, and carboxylic acids; viruses, bacteria, proteins, and other natural as well as synthetic polymers. Practical examples for separating such materials are desalination and purification of saline water, brackish water, and general waste water; softening of hard water, desalination of sea water, and recovery of useful substances from sea water. The present invention membrane is also suitable for concentration of fruit juice, vegetable juice, molasses, milk, coffee extract, and many other materials. It is particularly suited for use in purifying aqueous solutions containing dissolved inorganic salts.

Further, the present phosphorylated cellulose ester membrane is also suited for use in ultrafiltration and dialysis to separate low-molecular-weight solutes from high-molecular-weight solutes and colloids, and in electrodialysis as an ion-exchange membrane to separate various substances.

The invention is illustrated below in detail with reference to Examples, but the invention is not limited to the Examples.

EXAMPLE 1

In a 500 four-necked flask equipped with a thermometer, stirrer, dropping funnel, and nitrogen inlet, were placed 50 g of a cellulose acetate (reagent grade, Eastman Organic Chemicals Co., 39.8 % acetyl content)

and 75 g of phosphorus oxychloride. After addition of 375 g of acetone to dissolve the reactants in the flask, 50 g of pyridine was added dropwise under a steam of nitrogen at 20° to 25°C, and the reaction was allowed to proceed with stirring for 3 hours. The reaction product was isolated by pouring into a large volume of water, repeatedly washed with water until the washings no longer showed acidity, and dried thoroughly. The product thus obtained was a phosphorylated cellulose acetate having a phosphorus content of 1.80 % and an ion-exchange capacity of 1.00 meq./g (based on dry volume of membrane).

A 20 % solution of the said phosphorylated cellulose acetate, in dimethylformamide was prepared and poured on a clean plate glass to form a membrane. After having been dried at room temperature for 18 hours, the membrane had a thickness of 59 $\mu$ and a water content of 38.7 % on wet weight basis.

The membrane was subjected to reverse osmosis membrane test using a 0.5-% aqueous solution of sodium chloride. The solution was fed under a pressure of 91 atmospheres and at a rate of 270 cc/minute to a 5-cc cell which held the membrane, 47 mm in diameter. The phosphorylated cellulose acetate membrae showed 91 % rejection against sodium chloride and a water flux of 1.2 gallons/foot$^2$.day (hereinafter abbreviated to gfd).

EXAMPLE 2

Phosphorylation of cellulose acetate was conducted in the same way as in Example 1, except that 1,000 g of acetone was used to dissolve the cellulose acetate. There was obtained a product having a phosphorus content of 4.06 % and an ion-exchange capacity of 2.08 meq/g.

A 10-% solution of the said phosphorylated cellulose acetate in formic acid was prepared and poured on a clean plate glass to form a membrane. After having been dried at room temperature for 25 hours, the resulting membrane having a thickness of 15 $\mu$, showed 93.7 % rejection against sodium chloride, and a water flux of 3.1 gfd, as measured in the same manner as in Example 1.

EXAMPLE 3

A 15-% solution of the phosphorylated cellulose acetate obtained in Example 1 was prepared by use of a tetrahydrofuran-methanol (3 : 1 by volume) mixture, and poured on a clean plate glass to form a membrane. After having been dried at room temperature for 20 hours, a transparent membrane, 20 $\mu$ in thickness, was obtained.

The membrane was subjected to reverse osmosis membrane test using a 0.5-% aqueous sugar solution. The solution was fed under a pressure of 15 atmospheres and at a rate of 270 cc/minute to a 5-cc cell which held the membrane, 47 mm in diameter. The membrane showed 82 % rejection against sugar and a water flux of 13.5 gfd.

EXAMPLE 4

In a manner similar to that in Example 1, 20 g of cellulose acetate was dissolved in 150 g of acetone. After addition of 15 g of phosphorus oxychloride, 10 g of pyridine was added dropwise under a stream of nitrogen and at 20° to 25°C. The reaction was allowed to proceed for 3 hours with stirring.

After completion of the reaction, the reaction solution was directly poured on a clean plate glass and the solvent was evaporated for 60 seconds at room temperature. Immediately thereafter, the cast film together with the plate glass was immersed in water at 5° to 6°C, and hydrolysis and extraction of the solvent were continued for 3 hours to obtain a white opaque membrane, 80 $\mu$ in thickness.

The membrane was subjected to ultrafiltration membrane test using a 0.25-% aqueous solution of trypsin (molecular weight 20,000). The trypsin solution was fed under a pressure of 10 atmospheres and at a rate of 270 cc/minute to a 5-cc cell which held the membrane, 47 mm in diameter. The membrane showed 100 % rejection against trypsin and a water flux of 50 gfd. Phosphorus content of the membrane was 1.84 %.

EXAMPLE 5

In a manner similar to that in Example 1, 20 g of cellulose acetate was dissolved in 150 g of acetone. After addition of 7.5 g of phosphorus oxychloride, 5 g of pyridine was added dropwise under a stream of nitrogen and at 20° to 25°C. The reaction was allowed to proceed for 3 hours with stirring. The reaction product was isolated by pouring into a large volume of water, repeatedly washed with water until the washings no longer showed acidity, and dried thoroughly to obtain a product which was phosphorylated cellulose acetate having a phosporus content of 0.73 %.

A 30-% solution of the said phosphorylated cellulose acetate in formic acid was prepared and poured on a clean plate glass to form a membrane. After having been dried at room temperature for 30 hours, the membrane showed a thickness of 90 $\mu$, an ion-exchange capacity of 1.04 meq/g, and an electric resistance of 10.1 $\Omega$.cm$^2$, as measured in a 0.5-N aqueous solution of sodium chloride.

EXAMPLE 6

In a manner similar to that in Example 1, 50 g of cellulose acetate was dissolved in 800 g of acetone. After addition of 15.0 g of phosphorus oxychloride, 10 g of pyridine was added dropwise under a stream of nitrogen and at 20° to 25°C. The reaction was allowed to proceed for 4 hours with stirring. The reaction product was isolated by pouring the reaction mixture in a large volume of water, repeatedly washed with water until the washings no longer showed acidity, and dried thoroughly under reduced pressure to obtain a phosphorylated cellulose acetate having a phosphorus content of 0.22 %.

A 10-% solution of the said phosphorylated cellulose acetate in acetone was prepared and poured on a clean plate glass to form a membrane. After having been dried at room temperature for 5 hours, the membrane showed a thickness of 10 $\mu$. Desalination performance of the membrane was measured in a manner similar to that in Example 1 and found that under a pressure of 50 atmospheres the rejection against sodium chloride was 99 % and the water flux was 0.62 gfd.

EXAMPLE 7

Phosphorylation of cellulose acetate was conducted in the same manner as in Example 6, except that 52.5 g of phosphorus oxychloride and 35 g of pyridine were used. A product containing 0.80 % of phosphorus was obtained.

A 10-% solution of the said phosphorylated cellulose acetate in dimethylformamide was prepared and poured on a clean plate glass to form a membrane.

After having been dried at room temperature for 30 hours, the membrane showed a thickness of 8 μ.

Desalination performance of the membrane was measured in a manner similar to that in Example 1. It was found that under a pressure of 50 atmospheres the rejection against sodium chloride was 97.5 % and the water flux was 0.75 gfd.

EXAMPLE 8

Phosphorylation of cellulose acetate was conducted in the same manner as in Example 6, except that 67.5 g of phosphorus oxychloride and 45 g of pyridine were used. A product containing 1.40 g of phosphorus was obtained.

A 10-% solution of the said phosphorylated cellulose acetate in dimethylformamide was prepared and poured on a clean plate glass to form a membrane. After having been dried at room temperature for 30 hours, the membrane showed a thickness of 11 μ.

Desalination performance of the membrane was measured in a manner similar to that in Example 1. The membrane showed under a pressure of 50 atmospheres 90.0 % rejection against sodium chloride and a water flux of 0.97 gfd.

What is claimed is:

1. A phosphorylated cellulose ester membrane soluble in solvent for use in separation or concentration of substances in an aqueous solution, having a phosphorus content of from 0.1 to 10% and the formula

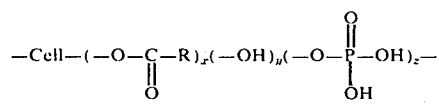

wherein Cell is a cellulose structural unit,

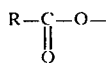

is a lower aliphatic acid residue, and x, y and z are positive numbers satisfying the relation x+y+z=3.

2. A phosphorylated cellulose ester membrane according to claim 1, wherein the membrane is a symmetric membrane.

3. A phosphorylated cellulose ester membrane according to claim 1, wherein the membrane is an asymmetric membrane.

4. A phosphorylated cellulose ester membrane according to claim 1, wherein the membrane is a porous membrane.

5. A phosphorylated cellulose ester membrane according to claim 1, wherein the membrane has a thickness of 1 to 500 μ.

6. A phosphorylated cellulose ester membrane according to claim 1, wherein phosphorus content of the membrane is in the range from 1 to 10 %.

7. A phosphorylated cellulose ester membrane according to claim 1, wherein phosphorus content of the membrane is in the range from 3 to 10 %.

8. A phosphorylated cellulose ester membrane according to claim 1, wherein ion-exchange capacity of the membrane is 0.1 to 3.5 meq./g.

9. A phosphorylated cellulose ester membrane according to claim 1, wherein the cellulose ester is at least one member selected from lower aliphatic acid esters of cellulose.

10. A phosphorylated cellulose ester membrane according to claim 9, wherein the lower aliphatic acid ester of cellulose is an ester of cellulose with formic acid, acetic acid, propionic acid, β-hydroxypropionic acid, butyric acid, lactic acid, tartaric acid, pyruvic acid, malic acid, maleic acid, methacrylic acid, crotonic acid, sorbic acid, succinic acid, methylsuccinic acid, ethylsuccinic acid, propylsuccinic acid, or adipic acid.

11. A phosphorylated cellulose ester membrane according to claim 10, wherein the lower aliphatic acid ester of cellulose is cellulose acetate or cellulose butyrate.

* * * * *